United States Patent [19]

Skowronski et al.

[11] Patent Number: 5,660,926
[45] Date of Patent: Aug. 26, 1997

[54] HIGH EQUIVALENT WEIGHT POLYESTER POLYOLS FOR CLOSED CELL, RIGID FOAMS

[75] Inventors: Michael J. Skowronski, Clearwater; Kenneth G. Trout, Tampa, both of Fla.

[73] Assignees: The Celotex Corporation, Tampa, Fla.; Apache Products Co., Anderson, S.C.

[21] Appl. No.: 761,926

[22] Filed: Dec. 9, 1996

Related U.S. Application Data

[62] Division of Ser. No. 387,642, Feb. 13, 1995, Pat. No. 5,605,940.

[51] Int. Cl.$^6$ ............................. C08G 18/34; B32B 3/26
[52] U.S. Cl. .............................. 428/314.4; 521/172
[58] Field of Search ......................... 428/314.4; 521/172

[56] References Cited

U.S. PATENT DOCUMENTS

| | | | |
|---|---|---|---|
| 4,237,238 | 12/1980 | DeGuiseppi et al. | 521/131 |
| 4,246,365 | 1/1981 | Wiedermann et al. | 521/172 |
| 4,346,229 | 8/1982 | Leighton | 560/91 |
| 4,400,477 | 8/1983 | Blanpied | 521/112 |
| 4,411,949 | 10/1983 | Snider et al. | 428/304.4 |
| 4,465,793 | 8/1984 | Brennan et al. | 521/172 |
| 4,521,611 | 6/1985 | Magnus | 560/91 |
| 4,526,908 | 7/1985 | Magnus et al. | 521/172 |
| 4,624,970 | 11/1986 | Dwyer et al. | 521/131 |
| 4,636,529 | 1/1987 | Crooker | 521/131 |
| 4,714,717 | 12/1987 | Londrigan et al. | 521/131 |
| 4,720,571 | 1/1988 | Trowell | 560/91 |
| 4,927,863 | 5/1990 | Bartlett et al. | 521/131 |
| 4,972,002 | 11/1990 | Volkert | 521/120 |
| 5,013,766 | 5/1991 | Hanusa | 521/137 |
| 5,109,031 | 4/1992 | Snider | 521/99 |
| 5,254,600 | 10/1993 | Blanpied et al. | 521/125 |
| 5,367,000 | 11/1994 | Wiedermann et al. | 521/131 |

*Primary Examiner*—Morton Foelak
*Attorney, Agent, or Firm*—Charles W. Vanecek

[57] ABSTRACT

A closed cell, rigid polymer foam which comprises the reaction product of a polyisocyanate and an isocyanate-reactive component in the presence of a catalyst and a hydrogen-containing blowing agent or a mixture of a hydrogen-containing blowing agent and at least one co-blowing agent wherein the isocyanate-reactive component comprises (a) a hydroxy terminated polyester having an equivalent weight greater than about 350, or (b) a mixture of the hydroxy terminated polyester with at least one other isocyanate-reactive compound. Foams prepared with the hydroxy terminated polyester have superior shrinkage resistance, strength and long-term insulating efficiency.

18 Claims, 1 Drawing Sheet

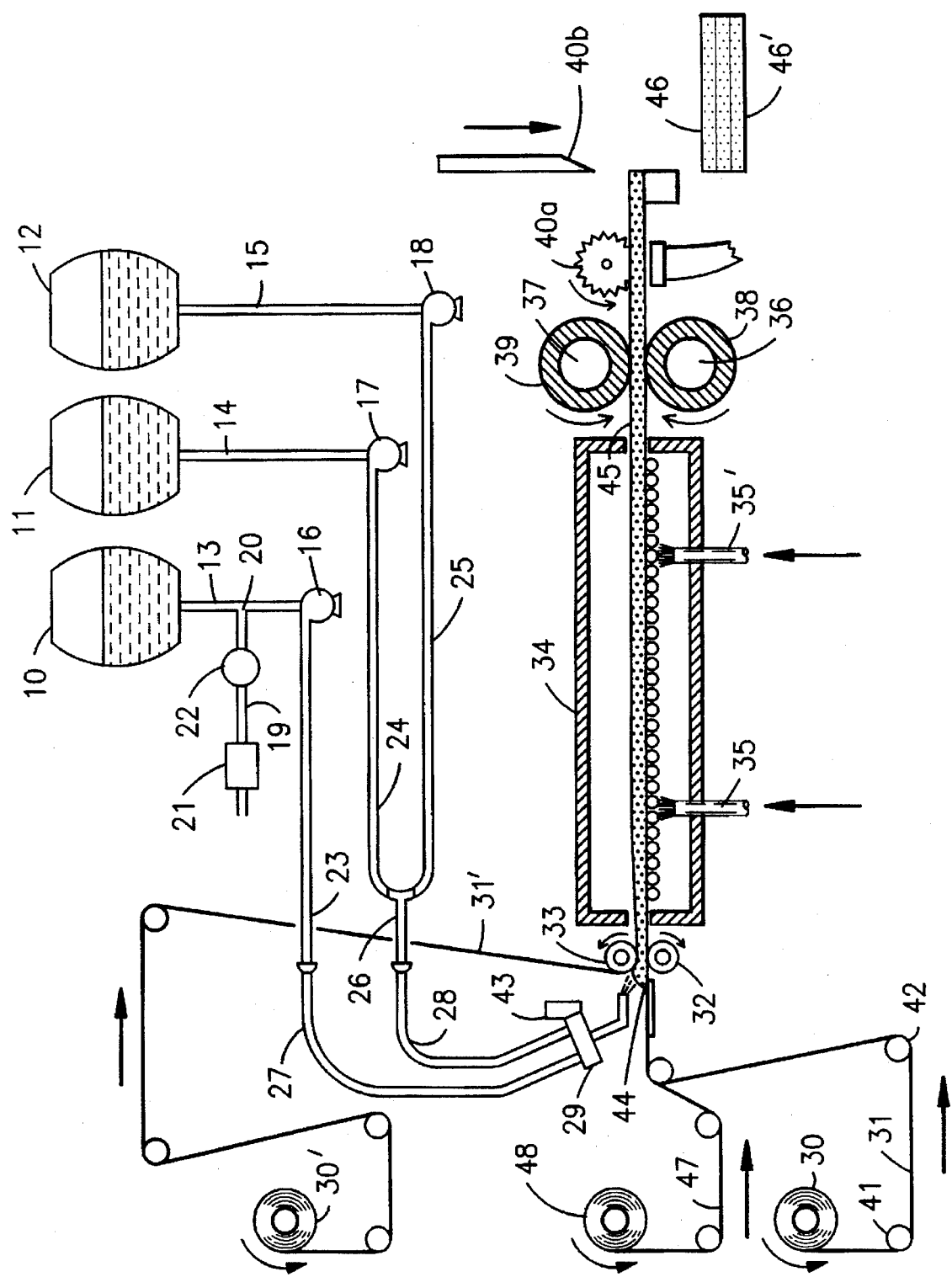

HIGH EQUIVALENT WEIGHT POLYESTER POLYOLS FOR CLOSED CELL, RIGID FOAMS

This is a division of application Ser. No. 08/387,642, filed Feb. 13, 1995 now U.S. Pat. No. 5,605,940.

BACKGROUND OF THE INVENTION

1. Field of the Invention

This invention relates to the preparation of insulating foams having a superior shrinkage resistance, strength and long-term insulating efficiency, and is more particularly concerned with high equivalent weight polyester polyols for the preparation of such foams from compositions containing blowing agents used to replace the conventional fully halogenated chlorofluorocarbons.

2. Description of the Prior Art

It is well known in the manufacture of rigid polyurethane and polyisocyanurate foams to employ chlorofluorocarbons, such as trichlorofluoromethane, as the blowing agent. These chlorofluorocarbon compounds boil or exhibit a significant vapor pressure at ambient temperatures and are volatilized during the exothermic reaction of an isocyanate with an active hydrogen-containing compound, such as a polyol. The expanding gas is entrapped within the reaction mixture and forms an insulating cellular structure. While the foam industry has had good results using the conventional chlorofluorocarbon blowing agents, such as CFC-11, the agents have come under attack in recent years on the ground that they are believed to give rise to environmental problems concerned with ozone depletion in the stratosphere. Accordingly, the search is ongoing for alternative blowing agents with a low ozone depletion factor to replace the conventional ones.

It is believed that hydrochlorofluorocarbons (also known as HCFC's), which are partially halo-substituted hydrocarbons, present less risk than the CFC's. Because the HCFC's contain one or more hydrogen atoms, they more readily dissociate under conditions encountered in the atmosphere, and therefore, less of them would reach the ozone layer of the stratosphere in a form which could cause significant damage. Accordingly, the hydrogen-containing halocarbons are being used as alternatives for CFC-11 in rigid foam applications.

The search for acceptable alternative blowing agents is complicated because of the combination of performance characteristics desired of them. One quite important characteristic is that use of the agents must not cause unacceptable cell shrinkage in the finished foam products. In this regard, it has been found that closed-cell polyisocyanurate foam made with a hydrochlorofluorocarbon such as HCFC-141b and conventional polyols shrinks at low temperatures. It is also desired that the blowing agents have an appropriately low flammability and toxicity. The agents further must not react with the other components of the foam formulation and should be adequately miscible in the foam system. Also, their boiling point, vapor thermal conductivity, capacity to efficiently produce gas and diffusion rate must be appropriate for the formation of highly insulating foams. Finally, the alternative blowing agents should be reasonable in cost.

There still remains a need for a closed cell, rigid foam which has superior properties even though the conventional CFC blowing agents are avoided in its production.

OBJECTS OF THE INVENTION

It is therefore an object of the present invention to provide closed cell, rigid foams, especially polyisocyanurate and polyurethane foams, having a combination of advantageous properties, including high initial and aged insulation value, superior shrinkage-resistance, particularly at low temperatures, reduced friability, high strength and resistance to thermal decomposition, and good dimensional stability.

It is another object of the present invention to produce an improved closed cell, rigid polyisocyanurate foam material having a combination of advantageous properties, including a superior resistance to cell shrinkage, especially at low temperatures, from a foam-forming composition containing a polyester polyol and a blowing agent having reduced ozone depletion potential.

It is still another object of the present invention to provide a high equivalent weight OH-terminated polyester for the production of an alternative blowing agent-containing closed cell, rigid foam, especially a polyisocyanurate foam, having a combination of desirable properties, including an appropriate reactivity profile, a reduced friability, good dimensional stability, and high thermal stability, insulation value and compressive strength.

It is a further object of the present invention to provide a high equivalent weight OH-terminated polyester whose use in the production of polyisocyanurate foam contributes to improved shrinkage resistance, particularly at low temperatures, of the resultant foam.

It is a still further object of the present invention to provide closed cell, rigid foam materials which can be used in building panels which are highly insulating, dimensionally stable, thermally resistant, soundproof and self-supporting.

BRIEF DESCRIPTION OF DRAWING

The invention will now be described with reference to the accompanying drawing which is a side schematic representation of an apparatus suitable for producing a polyisocyanurate foam material in accordance with the present invention.

SUMMARY OF THE INVENTION

The above objects have been achieved and the drawbacks of the prior art have been overcome by the use of high equivalent weight polyester polyols in the production of closed cell, rigid foams. Applicants have discovered that use of OH-terminated polyesters whose equivalent weight is greater than that of the conventionally used polyesters yields foams having exceptional physical properties, especially superior shrinkage resistance, strength and long-term insulating efficiency. The polyester polyol of the invention comprises an OH-terminated polyester having an equivalent weight which suitably is in excess of about 350, and advantageously is at least equal to 400, more advantageously 450. Use of the long chain polyester, either alone or in combination with at least one other isocyanate-reactive component, such as a glycol, significantly improves the performance of polyurethane and polyisocyanurate foams made with alternative blowing agents.

The high equivalent weight polyester polyols of this invention can be produced by reacting at least one polycarboxylic acid and/or acid derivative (e.g., anhydride or ester) with a polyol component which preferably comprises at least one glycol compound. Reaction is conveniently effected by admixing the acid(s) and/or derivative(s) thereof with the polyol or polyols, which are preferably in excess of the quantity to be reacted, and establishing and maintaining the resulting mixture in an elevated temperature range for a period of time sufficient for complete reaction. Generally, enough esterification or transesterification catalyst is added to the reaction mixture to suitably promote the reaction. Any conventional catalyst (single compound or mixture of compounds), such as organotin compounds, other metal catalysts, e.g., tetraisopropyl titanates, and the like, can be used. While the polyester polyols can be prepared from substantially pure reactant materials, more complex ingredients can also be used, such as the side-stream, waste or scrap residues from the manufacture of phthalic acid, terephthalic acid, dimethyl terephthalate, polyethylene terephthalate, adipic acid and the like, or suitable polyol side-stream sources.

The improved foams of the invention are suitably prepared from reactants comprising a polyisocyanate and the high equivalent weight polyester polyol, preferably an aromatic polyester polyol, which are brought together in the presence of a catalyst mixture and at least one hydrogen atom-containing blowing agent, preferably a hydrogen-containing halocarbon, such as HCFC-141b (1,1-dichloro-1-fluoroethane). The foaming reaction may be carried out in the presence of auxiliaries and additives as required (e.g., a surfactant).

The polyisocyanate component employed in the preparation of the cellular polymers of the invention can be any of the polyisocyanates known to be useful in the art of polymer formation. A preferred group of polyisocyanates are the aromatic polyisocyanates, especially methylene-bridged polyphenyl polyisocyanate mixtures.

The polyisocyanate is reacted with the high equivalent weight polyester polyol or its mixture with at least one other isocyanate-reactive compound, such as a polyether polyol. In a preferred embodiment of the invention, the polyol component comprises 50 to 100%, by weight, of the high equivalent weight polyester polyol, preferably an aromatic polyester polyol containing phthalic acid residues. Low molecular weight aliphatic polyhydric alcohols, such as aliphatic dihydric alcohols having no more than about 20 carbon atoms, are especially useful in preparing the polyester polyol of the invention.

DETAILED DESCRIPTION OF THE INVENTION

The present invention relates to the discovery that high equivalent weight polyester polyols have an exceptional capacity to enhance the shrinkage resistance of cellular foams, particularly of urethane and isocyanurate foams. The high equivalent weight polyester polyols of this invention are advantageously made by reacting at least one polycarboxylic acid or acid derivative (e.g., anhydride or ester) with at least one glycol or a glycol-containing mixture of polyols.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid and tall oil fatty acids; terephthalic acid dimethyl ester and terephthalic acid-bis glycol ester.

Particularly suitable polyester polyols of the invention are aromatic polyester polyols containing phthalic acid residues. Such residues advantageously comprise at least about 30% by weight of the acid component used to produce the polyols. By phthalic acid residue is meant the group

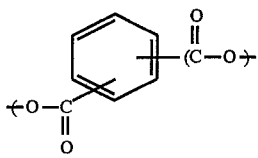

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the polyol component, e.g., glycol or glycol mixtures, to polyester polyols through conventional esterification or transesterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalate, especially polyethylene terephthalate (PET), residues or scraps and byproduct terephthalic acid streams.

Still other preferred residues are DMT process residues, which are produced from the manufacture of dimethyl terephthalate (DMT). During the manufacture of DMT in which p-xylene is converted through oxidation and esterification with methanol, the desired product is obtained in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the final residue from the system.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

A preferred polyol component for reaction with the polycarboxylic acid component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:

(a) alkylene radicals containing from 2 through 6 carbon atoms, and (b) radicals of the formula:

—$(R^1O)_m$—$R^1$— wherein $R^1$ is an alkylene radical containing from 2 through 6 carbon atoms, and m is an integer of from 1 through 4, and (c) mixtures thereof.

Besides the glycols, any suitable polyhydric alcohol may be used in preparing the polyester polyols. These additional polyols can be aliphatic, cycloaliphatic, aromatic and/or heterocyclic, and are preferably diols, but can include triols and tetrols. These polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used. The use of these additional polyols is tailored to ensure the obtainment of the equivalent weight required for enhanced foam shrinkage resistance.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bishydroxymethylcyclohexane).

The term "polyester polyol" is used in this specification and claims in the conventional sense and includes any unreacted alcohol (e.g., glycol) used in and remaining after the preparation of the polyester polyol and/or such alcohol added after the preparation. The unreacted glycol is commonly called "free glycol". Typically, polyester polyols currently employed in producing polyurethane and polyisocyanurate foams have free glycol levels which are at least about 7–12 percent by weight of the total polyester polyol and can range up to about 25–30 weight percent of the total. The beneficial effect on foam insulation value of lowering the polyester polyol's free glycol content is disclosed in U.S. Pat. No. 5,109,031.

In the preparation of a polyester polyol of the invention from alcohol and acid components, the amounts of the starting materials are chosen so as to increase the equivalent weight of the resultant polyol's OH-terminated ester portion, which is a hydroxy terminated polyester of the invention. Thus, for example, by producing the polyester polyol from glycol and dibasic acid starting materials with the glycol only in slight excess, high equivalent weights are attained. However, if too little excess glycol is originally added, the reaction will take unduly long. The reaction time can be shortened by initially starting with an excess and reducing the glycol level as the reaction proceeds. Thus, the reaction first may be conducted for some time with an elevated glycol/acid equivalent ratio, e.g., about 5:1 to 1.7:1, preferably about 2.5:1 to 1.7:1, and then continued to conclusion, after removal of glycol, with a reduced glycol/acid equivalent ratio, e.g., about 1.7:1 to 1.3:1. Illustratively, the reactants, such as diethylene glycol and phthalic anhydride, in a glycol:acid equivalent ratio of about 2.0:1.0 are initially reacted in a temperature range from about 180° to 240° C., preferably 200° to 220° C., for about 1 to 6 hours. The glycol:acid ratio is then reduced to about 1.4:1 by removal of free glycol through vacuum distillation, and the reaction is completed by heating the reactants at 200° to 220° C. for ca. 0.5 to 1.5 hours.

The resultant hydroxy terminated polyester portion of the polyester polyol advantageously has an equivalent weight of at least 400, more preferably at least 450, and most preferably at least 500. This high equivalent weight polyester may be used as the sole component for reaction with isocyanate in the foam-forming process, but usually is employed in the process with at least one other isocyanate-reactive compound, such as a glycol. As the equivalent weight of the hydroxy terminated polyester increases, so does its tolerance for other foam-forming ingredients, such as the glycols, that might otherwise have a detrimental effect on shrinkage. However, practical difficulties can be experienced in the processing of very high equivalent weight polyesters due to their viscosities. A preferred polyester polyol mixture of the invention is made up of the high equivalent weight hydroxy terminated polyester and free glycol in an amount of from 1 to 20, preferably 6 to 18 and more preferably 8 to 14, percent by weight, based on the weight of the total polyol mixture.

Comparison in foam production of mixtures of a given concentration of glycol and the high equivalent weight polyester with mixtures of the same level of the glycol and a lower equivalent weight polyester made from the same ingredients as the former mixtures has revealed that use of the former ones produces significantly enhanced foam properties, such as shrinkage resistance, compressive strength, and insulation value. It is thus possible to moderately increase the glycol level of the former mixtures and still produce foams comparable or superior in performance to those made from the corresponding mixtures containing a lower equivalent weight polyester and lower glycol content.

The present invention permits the manipulation of a polyester polyol's free glycol content to suit the exigencies of the given foam system. The free glycol content can be used to lower the viscosity of the polyester polyol whose viscosity generally increases as the equivalent weight of its ester portion increases. Since high equivalent weight polyesters of the invention can tolerate high free glycol (e.g., diethylene glycol) levels of up to 16% or more, the way is open for the use of quite fluid polyester polyols, which are relatively easy to handle, and will yield foams which are free of the serious drawbacks associated in the past with too high glycol levels. If practical considerations require an inventive polyester of lower equivalent weight and viscosity, then there is the opportunity to reduce the free glycol level and still get the benefit of a reasonably fluid polyester polyol which enhances foam properties.

The inventive polyesters polyols which include unreacted glycol advantageously contain on the average per molecule at least 1.8 hydroxyl groups and generally have an average equivalent weight of from about 150 to 450. Advantageously, these polyester polyols contain on the average per molecule from about 1.8 to 2.4 hydroxyl groups and have an average equivalent weight of from about 150 to 400, preferably from about 200 to 300. The viscosities (Brookfield) of the polyester polyols measured in cps. at 25° C. may vary broadly, e.g., from about 2000 to 50,000 and above.

It has been discovered that improved cold temperature shrinkage resistance is favored by low functionality of the polyester polyols, while improved flammability performance is favored by high functionality. The polyol's performance can be optimized by balancing these two factors. For example, polyester polyols based on flame-resisting and higher functional DMT process residues can be modified with a difunctional polycarboxylic acid component such as pure DMT to improve the resultant foam's cold temperature resistance. This combination not only improves the cold temperature resistance but also beneficially lowers the polyester polyol's viscosity. Difunctional aliphatic acids, such as adipic acid, also can be used to bring about a helpful lowering of functionality and viscosity.

Highly preferred polyester polyols of the invention are derived from the reaction of the polycarboxylic acid component, e.g., phthalic anhydride or phthalic acid, with diethylene and/or ethylene glycol, although combinations of either or both of these with higher glycols are also especially advantageous. An especially useful glycol charge contains about 34 to 100 mole percent of diethylene glycol and 0 to 66 mole percent of ethylene glycol. The resultant polyester polyols preferably have an average equivalent weight of 175 to 275, more preferably 200 to 250, an average ester equivalent weight of 350 to 1,000, more preferably 400 to 700, and a free glycol content of from 0 to 20, more preferably 8 to 16 percent by weight of the polyester polyol.

It is beneficial to incorporate as much ethylene glycol as possible into the hydroxy terminated polyester. The presence of ethylene glycol is found to be especially valuable in improving cold temperature shrinkage resistance. However, drawbacks associated with the use of too much ethylene glycol stem from its tendency to contribute to higher viscosities and concomitant processing problems and to negatively impact flame resistance. Additionally, it is helpful to reduce the level of free ethylene glycol in the overall polyester polyol to avoid processing problems. Combinations of ethylene glycol with one or more other glycols can be used to offset the above disadvantages.

Reactions with alkylene oxides also may be employed in the formation of the polyols of the invention. These reactions desirably are catalyzed. The temperature of the process should be from about 80° to 200° C., and the pressure should generally range from about 1 to 40 atmospheres.

In an advantageous embodiment of the invention, the polyester polyols are employed in admixture with at least one other polyol in the production of the foam compositions of the invention, especially the polyurethane foams. Polyols which can be employed in such admixtures include monomeric polyols and polyether polyols. Suitable polyether polyols are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 4–8).

The polymer foams of the present invention can be prepared by using standard techniques known to those skilled in the art. The closed cell, rigid polymer foams of the invention comprise the reaction product under foam-forming conditions of a polyisocyanate and an isocyanate-reactive component, wherein the isocyanate-reactive component comprises (a) a hydroxy terminated polyester having an equivalent weight greater than about 350, or (b) a mixture of the hydroxy terminated polyester with at least one other isocyanate-reactive compound, the equivalent weight of the hydroxy terminated polyester and the amount thereof in the foam being sufficiently high to reduce the cold temperature shrinkage of the foam to below the cold temperature shrinkage of the corresponding foam having the same density and being prepared from the same foam-forming mixture except that the equivalent weight of the hydroxy terminated polyester and/or the amount thereof is lower. The high equivalent weight hydroxy terminated polyester typically will reduce a foam's cold temperature shrinkage (measured after exposure to a temperature $\leq 0°$ F. for 18 hours) by at least about 25, preferably at least about 50 and more preferably at least about 75 percent, as compared to a conventional foam prepared without the hydroxy terminated polyester. The high equivalent weight hydroxy terminated polyesters are particularly useful in the preparation of polyisocyanurate foams and polyurethane foams. These foams are prepared by reacting together under foam-forming conditions an organic polyisocyanate with an isocyanate-reactive component which comprises (a) the hydroxy terminated polyester or (b) a mixture of the hydroxy terminated polyester with at least one other isocyanate-reactive compound (e.g., other polyol), the content of hydroxy terminated polyester in mixture (b) generally being at least about 20 percent by weight. The polyisocyanurate and polyurethane foams typically can be prepared by mixing together the organic polyisocyanate with the polyol, catalyst and blowing agent at temperatures ranging from about 0° C. to 150° C.

The polyurethane foams can be prepared by reacting the polyol of the invention and polyisocyanate on an essentially 1:1 to 1:1.25 equivalent basis. In the embodiment wherein the hydroxy terminated polyesters of the invention are combined with another polyol(s) to produce polyurethane foams, the hydroxy terminated polyesters of the invention can comprise about 5 to 100, preferably about 40 to 100 and more preferably about 50 to 100, weight percent of the total polyol content in the foam preparations.

The polyisocyanurate foams of the invention are prepared by reacting the polyisocyanate with a minor amount of polyol, such as sufficient polyol to provide about 0.10 to 0.70 hydroxyl equivalents of polyol per equivalent of said polyisocyanate, wherein the hydroxy terminated polyester of the invention comprises about 5 to 100, and preferably about 50 to 100, weight percent of the total polyol content in the foam preparations.

The polyisocyanate component employed in the foam preparation can be any of the polyisocyanates known to be useful in the art of polymer formation. The organic di-or polyisocyanates of the invention include aliphatic, cycloaliphatic, araliphatic, aromatic and heterocyclic polyisocyanates and combinations thereof characterized in having two or more isocyanate (NCO) groups per molecule.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, polymethylenepolyphenylene-polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2 4'-, and/or 2,2,-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates.

Most particularly preferred are the polymeric MDI's.

Still other useful organic polyisocyanates are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

Any suitable hydrogen atom-containing blowing agent can be employed in the foam compositions of the present invention. The alternative blowing agents, which can be used alone or as mixtures, can be selected from a broad range of materials, including partially halogenated hydrocarbons, ethers, and esters, hydrocarbons, esters, ethers, and the like. Among the usable hydrogen-containing halocarbons are the HCFC's such as 1,1-dichloro-1-fluoroethane (HCFC-141b), 1,1-dichloro-2,2,2-trifluoroethane (HCFC-123), monochlorodifluoromethane (HCFC-22), 1-chloro-1,1-difluoroethane (HCFC-142b), 1,1-difluoroethane (HCFC-152a), 1,1,1,2-tetrafluoroethane (HFC-134a), 1,1,1,4,4,4-hexafluorobutane (HFC-356), 1,1,1,4,4-pentafluorobutane (HFC-365), 1,1,2,2,3,3-hexafluoropropane (HFC-236c,a), 1,1,1,2,3,3-hexafluoropropane (HFC-236e,a), pentafluoroethane (HFC-125), methyl-1,1,1-trifluoroethylether (HFE-263), difluoromethyl-1,1,1-trifluoroethylether (HFE-245), 1,1,2,2,3-pentafluoropropane (HFC-245c,a), 1,1,1,2,3-pentafluoropropane (HFC-245e,b), and 1,1,1,3,3-pentafluoropropane (HFC-245f,a). Representative hydrocarbons include n-pentane, isopentane, and cyclopentane.

A wide variety of co-blowing agent(s) can be employed in conjunction with the hydrogen-containing halocarbons in preparing the foam compositions of the invention. Water, air, nitrogen, carbon dioxide, readily volatile organic substances and/or compounds which decompose to liberate gases (e.g., azo compounds) may be used. Typically, these co-blowing agents are liquids having a boiling point between minus 50° C. and plus 100° C., and preferably between −50° C. and +50° C.

A preferred method for the production of froth foams of the invention is disclosed in U.S. Pat. No. 4,572,865, whose disclosure is hereby incorporated by reference. In this method, the froth-forming blowing agent can be any material which is inert to the reactive ingredients and easily vaporized at atmospheric pressure. This frothing agent advantageously has an atmospheric boiling point of −50° C. to 10° C. In a desirable embodiment of the invention, a higher boiling blowing agent is used in conjunction with the frothing agent. The former blowing agent advantageously has an atmospheric boiling point ranging from about 10° to 80° C.

The blowing agents are employed in an amount sufficient to give the resultant foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N,N'-tetramethylethylenediamine, 1,1,3,3-tetramethylguanidine, N,N, N'N'-tetramethyl-1,3-butanediamine, N,N-dimethylethanolamine, N,N-diethylethanolamine, and the like.

In the preparation of the polyisocyanurate rigid foams, any catalyst that will induce reaction of the isocyanate with the polyol and will induce isocyanurate ring formation can be employed in the foam preparations of the invention. Most commonly used trimerization catalysts also function to catalyze the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate, 2-ethylhexanoate and the like. Suitable urethane catalysts include, for instance, tertiary amines such as triethyl amine or N,N-dimethylethanolamine as well as 1,4-diazabicyclo [2.2.2] octane and organo tin compounds such as dibutyltin diacetate, stannous octoate and dibutyltin dilaurate.

The catalyst or catalyst mixture is used in a catalytically effective amount. Generally, the catalyst comprises from about 0.1 to 20 and preferably from about 0.3 to 10 weight percent of the total foam-forming composition.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from OSi Specialties, Inc. under the trade names "Y-10222", "Y-10764", "L-5420" and "L-5340", from the Dow Corning Corporation under the trade names "DC-193" and "DC-5315", and from Goldschmidt Chemical Corporation under the tradenames "B-8408" and "B-8407". It has been found that surfactants such as Y-10764 can contribute significantly to an increase in foam insulation value. Other suitable surfactants are those described in U.S. Pat. Nos. 4,365,024 and 4,529,745 and supplied by Sloss Industries Corporation under the trademarks FoamStab 100 and 200. Generally, the surfactant comprises from about 0.05 to 10, and preferably from 0.1 to 6, weight percent of the foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate and a mixture of β-chloropropyl phosphate esters with isomeric chloropropyl groups wherein the isopropyl structure predominates, dispersing agents, plasticizers, mold release agents, antioxidants, compatibility agents, and fillers and pigments (e.g., carbon black). The use of such additives is well known to those skilled in the art.

The present invention also provides a process for producing a laminate which comprises (a) contacting at least one facing sheet with a foam-forming mixture comprising the polyisocyanate, hydroxy terminated polyester, blowing agent, catalyst mixture, and auxiliaries and additives as required (e.g., a surfactant), and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold. Both free rise and restrained rise processes, such as disclosed in U.S. Pat. No. 4,572,865, may be employed in the foam production.

Any facing sheet previously employed to produce building panels can be employed in the present invention. Examples of suitable facing sheets include, among others, those of kraft paper, aluminum, glass mats, glass reinforced organic felts, and asphalt impregnated felts, as well as laminates of two or more of the above.

The foam materials of the invention can also be used, with or without a facet(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

It is common practice in the manufacture of the rigid cellular polyisocyanurates to utilize two preformulated components, commonly called the A-component and the B-component. Typically, the A-component contains the isocyanate compound that must be reacted with the polyol of the B-component to form the foam, and the remaining foam-forming ingredients are distributed in these two components or in yet another component or components.

One method of utilizing the inventive polyol in a foam-forming process can be illustrated with reference to the apparatus shown in the drawing. The apparatus includes tanks 10, 11 and 12 for containing the foamable ingredients and additives such as isocyanate, polyol, filler, surfactant, dye, blowing agent, etc. The tanks are charged with the foam-forming mixture in whatever manner is convenient and preferred for the given mixture. For instance, the foam-forming mixture can be divided into three liquid components, with the polyisocyanate and surfactant in tank 10, the polyol in tank 11, the catalyst in tank 12, and the blowing agent in tank 10 or 11 or divided between these tanks, each tank respectively connected to outlet lines 13, 14 and 15. When water is used as a co-blowing agent, it is conveniently added to tank 11 or introduced into polyol line 14. The temperatures of the ingredients are controlled to ensure satisfactory processing. The lines 13, 14 and 15 form the inlet to metering pumps 16, 17 and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, tank 10 is charged with the organic polyisocyanate admixed with the surfactant, tank 11 is charged with the polyol, and tank 12 is charged with the catalyst composition. The blowing agent may be charged to tank 10 or tank 11, or divided between these tanks. The speeds of the pumps 16, 17 and 18 are adjusted to give the desired ratios of the ingredients contained in the tanks 10, 11 and 12, whereupon these ingredients pass respectively into lines 13, 14 and 15. When used, a frothing agent is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper facing material 31 and 31' having therebetween a foamable mixture 44 now passes into the oven 34 and on along the generally horizontally extending conveyor. While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35, 35' in order to ensure that the temperature within the oven 34 is maintained within the desired limits of 100° F. to 300° F., and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

Numerous other modifications to the above-described apparatus will be immediately apparent to those skilled in the art. For example, the tanks 10, 11 and 12 can be provided with refrigeration means in order to maintain the reactants at subambient temperatures. In one modification, a frothing agent is not delivered into lines 13 or 14, but is admixed with the foam-forming ingredient(s) in tanks 10 and/or 11. This approach is especially advantageous for handling large amounts of a highly volatile frothing agent, which can, for example, be apportioned in tanks 10 and 11 which are specially adapted (e.g., pressurized) to hold the frothing agent-containing formulations.

As shown in the drawing, a reinforcing web 47 can be fed into the apparatus. Fiberglass fibers constitute a preferred web material. For example, in a preferred embodiment the reinforcing web will be the type of glass mat used in producing the structural laminate of U.S. Pat. No. 4,028,158, i.e., a thin mat of long, generally straight glass fibers. In accordance with this embodiment, a thin mat 47 of glass fibers is fed from roll 48 toward the nip between the two rotating metering rolls 32 and 33. By virtue of rotation of the pull rolls 36 and 37, reinforcing mat 47 is pulled from its roll, through the nip of the metering rolls and downstream to form part of the resulting structural laminate.

The invention is further illustrated by the following examples in which all parts and percentages are by weight unless otherwise indicated.

EXAMPLE 1

This example illustrates the preparation of aromatic polyester polyols having a low free glycol content and different equivalent weights by reacting phthalic anhydride (PA) with diethylene glycol (DEG).

The starting equivalent ratio of DEG:PA for each polyol is shown in Table I below. The DEG and a catalytic amount of tetraisopropyl titanate were added to a reaction flask equipped with a stirrer, Vigreaux column, reflux condenser and collector. The ingredients, under a nitrogen stream, were brought to 140° C., the PA was added, and then all ingredients were heated to and held at ca. 220° C. and the water distillate was collected in a weighed receiver. When an acid number $\leq 5$ was obtained, heating was stopped. The reaction time at 220° C. for each polyol is shown in Table I.

Each resultant polyol was reduced in glycol content by means of a Pope Scientific 2" concentrator/evaporator equipped with a variable speed drive, digital RPM indicator, and an Omega Engineering temperature controller. Glycol reduction was performed with a jacket temperature of 175° C., a vacuum of ca. 2 mm Hg, and a flow rate of about 0.2 g/sec. to yield Polyol Nos. 1, 2 and 3 having the properties reported in Table I.

TABLE I

PREPARATION OF POLYESTER POLYOLS

| | DEG:PA | | Polyol | | | |
|---|---|---|---|---|---|---|
| Polyol No. | Equivalent Ratio[1] | Reaction Time, min. | Eq. Wt.[2] | Ester Eq. Wt.[3] | % Free Glycol | Viscosity cps, 25° C. |
| 1 | 2.25 | 120 | 229 | 231 | 0.2 | 15,700 |
| 2 | 1.75 | 165 | 338 | 352 | 0.7 | 46,000 |
| 3 | 1.75 | 165 | 351 | 355 | 0.3 | 53,300 |

Footnotes:
[1]Ratio of DEG:PA equivalents charged to reaction flask.
[2]Equivalent weight of total polyol mixture inclusive of unreacted glycol.
[3]Equivalent weight of ester portion, i.e., polyester polyol exclusive of unreacted glycol.

EXAMPLE 2

This example illustrates the synthesis of polyisocyanurate foams (12% trimer) from aromatic polyester polyols having a low free glycol content and different equivalent weights and the evaluation of the foams' shrinkage resistance.

Foams A–C were prepared from the ingredients and quantities thereof listed in Table II below. The foam shrinkage studies were conducted with the use of a heated L-mold.

The L-mold, which has both a horizontal and a vertical leg, was preheated to 140° F. In each foam preparation, the isocyanate, HCFC-141b, and surfactant of the A-component were blended, cooled to 60° F. and introduced into a quart can. The polyester polyol and HCFC-141b of the B-Component were then added to the can, and all ingredients were stirred rapidly for 15–20 seconds. The catalyst (C-Component) was then mixed into the contents of the vessel. All ingredients were thereafter mixed vigorously for an additional 10 seconds and then the quart can containing the ingredients was immediately placed into the port of the mold's horizontal leg. The mold port cover was replaced and clamped. The foam was allowed to cure for 5 minutes at the 140° F. mold temperature and then the mold was opened.

After removal from the mold, the cured foam portion which had been contained in the vertical leg was cut from the rest of the sample and post-cured in a 140° F. oven for 2 hours. A 10"×10"×1" test specimen was cut from the center of this post-cured foam, and the specimen's volume (initial) was recorded. The test specimen was placed in a 0° F. freezer for 18 hours. After its removal from the freezer, and equilibration for ca. 15 minutes to room temperature, the test specimen's volume (final) was determined by water displacement. The amount of shrinkage was calculated using the following formula:

$$\% \text{ Shrinkage} = \frac{\text{Initial Volume} - \text{Final Volume}}{\text{Initial Volume}} \times 100$$

The percent shrinkage and other properties of Foams A-C are shown in Table II.

The results indicate that the cold temperature shrinkage of polyisocyanurate foams made from aromatic polyester polyols having a low free glycol content (0.2–0.7 weight %) is significantly reduced by increasing the equivalent weight of the ester portion of the polyester polyol.

TABLE II

SYNTHESIS AND PROPERTIES OF POLYISOCYANURATE FOAMS

| INGREDIENTS | FOAMS | | |
|---|---|---|---|
| | A | B | C |
| A-Component | | | |
| Mondur MR-200[1] | 186.6 | 170.9 | 169.5 |
| HCFC-141b | 27.1 | 22.7 | 21.4 |
| Silicone Surfactant | 2.2 | 2.2 | 2.2 |
| B-Component | | | |
| Polyol[2]-parts | 1–113.4 | 2–129.1 | 3–130.5 |
| HCFC -141b | 24.9 | 28.3 | 28.6 |

TABLE II-continued

SYNTHESIS AND PROPERTIES OF POLYISOCYANURATE FOAMS

| INGREDIENTS | FOAMS | | |
|---|---|---|---|
| | A | B | C |
| C-Component | | | |
| Catalyst[3] | 7.9 | 8.7 | 8.5 |
| FOAM PROPERTIES | | | |
| Reactivity, sec (Cream/Firm) | 23/48 | 20/110 | 22/180 |
| Density, lb/ft$^3$ | 2.07 | 1.80 | 1.79 |
| % Shrinkage | 8.5 | 2.2 | 2.1 |

FOOTNOTES:
[1]Mondur MR-200 = polymethylene polyphenyl isocyanate having an equivalent weight of 138, and a viscosity of ~1800 cps at 25° C.. (supplied by Miles Inc.).
[2]Of Example 1.
[3]Catalyst = a mixture employed in the form of a solution in polyethylene glycol (PEG-200) in a 1:1:1:2 weight ratio of potassium octoate (70% in diethylene glycol) :2,4,6-tris [dimethylaminomethyl]phenol: N-hydroxyisopropyl methyl ammonium salt of formic acid: PEG-200, respectively (supplied by the EleCorporation).

EXAMPLE 3

This example illustrates the preparation of aromatic polyester polyols having a free glycol content of 16 weight percent and different equivalent weights from PA and DEG.

The starting equivalent ratio of DEG:PA for each of Polyol Nos. 6, 7 and 8 is shown in Table III below. The ingredients were reacted at 220° C. as in Example 1 until an acid number ≦5.0 was reached. The reaction time at 220° C. is given in the table.

Each resultant polyol mixture was cooled slightly, a vacuum was applied and DEG was distilled from the reaction flask until the equivalent ratio of DEG:PA in the flask was reduced to the final ratio shown in Table III. The temperature of the reactants during this distillation ranged from ca. 175°–220° C. After this final ratio was reached, the reactants were held at 220° C. for ca. 1 hour without further distillation of DEG.

After cooling to ambient temperature, each composition was blended with additional DEG to give a 16% free glycol content. Similarly, additional DEG was blended with a portion of Polyol Nos. 2 and 3 of Example 1 to yield Polyol Nos. 4 and 5, respectively, each having 16% free glycol. The properties of the resultant polyol mixtures are reported in Table III.

TABLE III

PREPARATION OF POLYESTER POLYOLS

| Polyol No. | DEG:PA Equivalent Ratio | | Reaction Time, min. | Polyol | | | |
|---|---|---|---|---|---|---|---|
| | Charge[1] | Final[2] | | Eq. Wt.[3] | Ester Eq. Wt.[4] | % Free Glycol | Viscosity cps, 25° C. |
| 4 | 1.75 | 1.75 | 165 | 185 | 352 | 16.0 | 3,750 |
| 5 | 1.75 | 1.75 | 165 | 186 | 355 | 16.0 | 4,330 |
| 6 | 2.00 | 1.40 | 150 | 212 | 493 | 16.0 | 8,860 |
| 7 | 2.00 | 1.50 | 310 | 212 | 494 | 16.0 | 5,820 |

TABLE III-continued

PREPARATION OF POLYESTER POLYOLS

| | DEG:PA | | | Polyol | | | |
|---|---|---|---|---|---|---|---|
| | Equivalent Ratio | | Reaction | | Ester | % Free | Viscosity |
| Polyol No. | Charge[1] | Final[2] | Time, min. | Eq. Wt.[3] | Eq. Wt.[4] | Glycol | cps, 25° C. |
| 8 | 2.00 | 1.40 | 120 | 217 | 524 | 16.0 | 8,000 |

Footnotes:
[1]Ratio of DEG:PA equivalents charged to reaction flask.
[2]Ratio of DEG:PA equivalents incorporated into polyester polyol.
[3]Equivalent weight of total polyol mixture inclusive of unreacted glycol.
[4]Equivalent weight of ester portion, i.e., polyester polyol exclusive of unreacted glycol.

EXAMPLE 4

This example illustrates the synthesis of polyisocyanurate foams (12% trimer) from aromatic polyester polyols having a free glycol content of 16 weight percent and different equivalent weights and the evaluation of the foams' shrinkage resistance.

Foams D-H were prepared from the ingredients and quantities thereof listed in Table IV below. The foam preparations and shrinkage determinations were conducted as described in Example 2. The foams' properties are shown in the table.

The results show that more than 10% cold temperature shrinkage is experienced by polyisocyanurate foams produced from polyester polyols whose free glycol content is greater than 10 weight percent and ester equivalent weight is in a range less than 400. The foams' shrinkage resistance is significantly improved by instead using polyester polyols having ester equivalent weights greater than 400, notwithstanding the presence of the same free glycol content in the higher equivalent weight polyester polyols.

TABLE IV

SYNTHESIS AND PROPERTIES OF POLYISOCYANURATE FOAMS

| | FOAMS | | | | |
|---|---|---|---|---|---|
| INGREDIENTS | D | E | F | G | H |
| A-Component | | | | | |
| Mondur MR-200[1] | 195.9 | 195.7 | 189.9 | 189.9 | 188.9 |
| HCFC-141b | 27.6 | 25.1 | 24.8 | 25.8 | 24.6 |
| Silicone Surfactant | 2.2 | 2.2 | 2.2 | 2.2 | 2.2 |
| B-Component | | | | | |
| Polyol[2]- | 4–104.1 | 5–104.3 | 6–110.1 | 7–110.1 | 8–111.1 |

TABLE IV-continued

SYNTHESIS AND PROPERTIES OF POLYISOCYANURATE FOAMS

| | FOAMS | | | | |
|---|---|---|---|---|---|
| INGREDIENTS | D | E | F | G | H |
| parts HCFC-141b | 22.9 | 22.9 | 24.2 | 24.2 | 24.4 |
| C-Component | | | | | |
| Catalyst[3] | 10.0 | 10.0 | 8.8 | 9.0 | 8.5 |
| FOAM PROPERTIES | | | | | |
| Reactivity, sec (Cream/Firm) | 23/47 | 23/57 | 18/36 | 18/35 | 20/41 |
| Density, lb/ft³ | 1.87 | 1.87 | 1.97 | 1.91 | 1.95 |
| % Shrinkage | 11.9 | 13.6 | 5.0 | 5.6 | 8.0 |

FOOTNOTES:
[1]Of Example 2.
[2]Of Example 3.
[3]Of Example 2.

EXAMPLE 5

This example illustrates the preparation of aromatic polyester polyols having a free glycol content of 8 weight percent and different equivalent weights from PA and DEG.

The starting equivalent ratio of DEG:PA for each of Polyol Nos. 9, 10 and 11 is shown in Table V below. In the preparation of Polyol No. 9, the ingredients were reacted and distilled as in Example 1 and then DEG was added to the resultant polyol mixture to bring the glycol level to 8%. Polyol Nos. 10 and 11 were prepared as in Example 3, with DEG similarly being added to yield the 8% level. The properties of the polyol mixtures are reported in Table V.

TABLE V

PREPARATION OF POLYESTER POLYOLS

| | DEG:PA | | | Polyol | | | |
|---|---|---|---|---|---|---|---|
| | Equivalent Ratio | | Reaction | | Ester | % Free | Viscosity |
| Polyol No. | Charge[1] | Final[2] | Time, min. | Eq. Wt.[3] | Eq. Wt.[4] | Glycol | cps, 25° C. |
| 9 | 2.00 | 2.00 | 180 | 233 | 310 | 8.0 | 15,300 |
| 10 | 2.00 | 1.40 | 150 | 296 | 493 | 8.0 | 33,800 |

TABLE V-continued

PREPARATION OF POLYESTER POLYOLS

| | DEG:PA Equivalent Ratio | | Reaction | | Polyol | | |
|---|---|---|---|---|---|---|---|
| Polyol No. | Charge[1] | Final[2] | Time, min. | Eq. Wt.[3] | Ester Eq. Wt.[4] | % Free Glycol | Viscosity cps, 25° C. |
| 11 | 2.00 | 1.40 | 120 | 307 | 524 | 8.0 | 24,500 |

Footnotes:
[1] Ratio of DEG:PA equivalents charged to reaction flask.
[2] Ratio of DEG:PA equivalents incorporated into polyester polyol.
[3] Equivalent weight of total polyol mixture inclusive of unreacted glycol.
[4] Equivalent weight of ester portion, i.e., polyester polyol exclusive of unreacted glycol.

EXAMPLE 6

This example illustrates the synthesis of polyisocyanurate foams (12% trimer) from aromatic polyester polyols having a free glycol content of 8 weight percent and different equivalent weights and the evaluation of the foams' shrinkage resistance.

Foams I-K of Table VI below were prepared from the ingredients and quantities thereof listed in the table. The foam preparations and shrinkage determinations were carried out as described in Example 2. The foams exhibited the properties shown in the table.

The table shows that reduction of the free glycol content of the polyols to under 10 weight percent leads generally to improved foam shrinkage resistance, as compared to the results shown in Example 4 for foams made from polyols having a free glycol content greater than 10 weight percent. The results further show that the use of polyols having both the lower free glycol content and high ester equivalent weights leads to a still greater improvement in foam shrinkage resistance.

TABLE VI

SYNTHESIS AND PROPERTIES OF POLYISOCYANURATE FOAMS

| | FOAMS | | |
|---|---|---|---|
| INGREDIENTS | I | J | K |
| A-Component | | | |
| Mondur MR-200[1] | 187.7 | 176.0 | 174.6 |
| HCFC-141b | 27.4 | 20.8 | 20.5 |
| Silicone Surfactant | 2.2 | 2.2 | 2.2 |
| B-Component | | | |
| Polyol[2]-parts | 9–112.3 | 10–124.0 | 11–125.4 |
| HCFC-141b | 24.6 | 27.2 | 27.5 |
| C-Component | | | |
| Catalyst[3] | 9.2 | 8.0 | 7.5 |
| FOAM PROPERTIES | | | |
| Reactivity, sec (Cream/Firm) | 21/44 | 17/34 | 19/48 |
| Density, lb/ft³ | 1.90 | 2.02 | 1.95 |
| % Shrinkage | 5.4 | 3.1 | 2.6 |

FOOTNOTES:
[1] Of Example 2.
[2] Of Example 5.
[3] Of Example 2.

EXAMPLE 7

This example illustrates the preparation of aromatic polyester polyols by reacting various mixtures of PA and DMT (dimethyl terephthalate) with DEG.

The starting equivalent ratio of DEG:PA:DMT for each of Polyol Nos. 12, 13 and 14 is shown in Table VII below. The polyols were prepared as in Example 3 with DMT being added as a powder at 140° C. after PA and with appropriate adjustment to a 12 weight % free glycol content.

TABLE VII

PREPARATION OF POLYESTER POLYOLS

| | DEG:PA:DMT Equivalent Ratio | | Reaction | | Polyol | | |
|---|---|---|---|---|---|---|---|
| Polyol No. | Charge[1] | Final[2] | Time, min. | Eq. Wt.[3] | Ester Eq. Wt.[4] | % Free Glycol | Viscosity cps, 25° C. |
| 12 | 2:.75:.25 | 1.4:.75:.25 | 120 | 233 | 434 | 12.0 | 19,010 |
| 13 | 2:.50:.50 | 1.4:.50:.50 | 120 | 264 | 575 | 12.0 | 34,400 |
| 14 | 2:.10:.90 | 1.4:.10:.90 | 120 | 255 | 530 | 12.0 | 52,290 |

Footnotes:
[1] Ratio of DEG:PA:DMT equivalents charged to reaction flask

TABLE VII-continued

PREPARATION OF POLYESTER POLYOLS

| | DEG:PA:DMT | | | Polyol | | | |
|---|---|---|---|---|---|---|---|
| | Equivalent Ratio | | Reaction | | Ester | % Free | Viscosity |
| Polyol No. | Charge[1] | Final[2] | Time, min. | Eq. Wt.[3] | Eq. Wt.[4] | Glycol | cps, 25° C. |

[2]Ratio of DEG:PA:DMT equivalents incorporated into polyester polyol.
[3]Equivalent weight of total polyol mixture inclusive of unreacted glycol.
[4]Equivalent weight of ester portion, i.e., polyester polyol exclusive of unreacted glycol.

EXAMPLE 8

This example illustrates the synthesis of polyisocyanurate foams (12% trimer) from aromatic polyester polyols which contain 12 weight % free glycol and are made from various PA/DMT mixtures.

Foams L-N were produced from the formulations presented in Table VIII below and the foams' % shrinkage was measured in accordance with the procedures of Example 2. The data shown in the table demonstrate that the foams, which are derived from polyester polyols whose ester equivalent weight is greater than 400, are highly resistant to shrinkage, exhibiting a % shrinkage of less than 7%.

TABLE VIII

SYNTHESIS AND PROPERTIES OF POLYISOCYANURATE FOAMS

| | FOAMS | | |
|---|---|---|---|
| INGREDIENTS | L | M | N |
| A-Component | | | |
| Mondur MR-200[1] | 185.81 | 180.63 | 182.06 |
| HCFC-141b | 19.93 | 18.80 | 19.61 |
| Silicone Surfactant | 2.20 | 2.20 | 2.20 |
| B-Component | | | |
| Polyol[2]-parts | 12–114.19 | 13–119.37 | 14–117.94 |
| HCFC-141b | 25.07 | 26.20 | 25.89 |
| C-Component | | | |
| Catalyst[3] | 6.90 | 3.00 | 4.20 |

TABLE VIII-continued

SYNTHESIS AND PROPERTIES OF POLYISOCYANURATE FOAMS

| | FOAMS | | |
|---|---|---|---|
| INGREDIENTS | L | M | N |
| FOAM PROPERTIES | | | |
| Reactivity, sec (Cream/Firm) | 21/41 | 20/36 | 18/39 |
| Density, lb/ft³ | 2.08 | 2.06 | 2.18 |
| % Shrinkage | 1.25 | 4.03 | 6.81 |

FOOTNOTES:
[1]Of Example 2.
[2]Of Example 7.
[3]Of Example 2.

EXAMPLE 9

This example illustrates the preparation of aromatic polyester polyols by reacting various mixtures of PA and a DMT process residue with (a) DEG and (b) a mixture of DEG and triethylene glycol.

The starting equivalent ratio of the reactants for each of Polyol Nos. 15–18 is shown in Table IX below. The polyols were prepared as in Example 3 with triethylene glycol being added in the initial charge and the DMT process residue being pre-melted and added at 140° C. after PA. The final free glycol level was adjusted to 12 weight % with DEG.

TABLE IX

PREPARATION OF POLYESTER POLYOLS

| | GLYCOL[1]:PA:T-101[2] | | | Polyol | | | |
|---|---|---|---|---|---|---|---|
| | Equivalent Ratio | | Reaction | | Ester | % Free | Viscosity |
| Polyol No. | Charge[1] | Final[2] | Time, min. | Eq. Wt.[3] | Eq. Wt.[4] | Glycol | cps, 25° C. |
| 15 | 2:.75:.25 | 1.4:.75:.25 | 150 | 238 | 451 | 12.0 | 32,390 |
| 16 | 2:.75:.25 | 1.4:.75:.25 | 120 | 267 | 546 | 12.0 | 26,060 |
| 17 | 2:.50:.50 | 1.4:.50:.50 | 180 | 232 | 416 | 12.0 | 58,420 |
| 18 | 2:.25:.75 | 1.4:.25:.75 | 165 | 224 | 400 | 12.0 | 171,440 |

[1]GLYCOL = DEG for Polyol Nos. 15, 17 and 18; mixture of DEG and triethylene glycol in a 7:3 weight ratio for Polyol No. 16.
[2]T-101 = DMT process residue having an acid number of 50 and saponification number of 460 (Cape Industries).
[3]Ratio of GLYCOL:PA:T-101 equivalents charged to reaction flask.
[4]Ratio of GLYCOL:PA:T-101 equivalents incorporated into polyeater polyol.
[5]Equivalent weight of total polyol mixture inclusive of unreacted glycol.
[6]Equivalent weight of ester portion, i.e., polyester polyol exclusive of unreacted glycol.

EXAMPLE 10

This example illustrates the synthesis of polyisocyanurate foams (12% trimer) from (a) aromatic polyester polyols which contain 12 weight % free glycol and are made from various PA/T-101 mixtures and (b) a comparative polyol, Terate 2541, made from a DMT process residue.

Foams O-S were produced from the formulation presented in Table X below and the foams' % shrinkage was measured in accordance with the procedures of Example 2. The data disclosed in the table reveal that the foams made from polyester polyols whose ester equivalent weight is at least 400 are significantly superior in shrinkage resistance to the comparative foam made from a polyester polyol whose ester equivalent weight is 383.

TABLE X

SYNTHESIS AND PROPERTIES OF POLYISOCYANURATE FOAMS

| INGREDIENTS | O | P | Q | R | S |
|---|---|---|---|---|---|
| A-Component | | | | | |
| Mondur MR-200[1] | 185.01 | 180.15 | 186.01 | 187.45 | 185.30 |
| HCFC-141b | 22.76 | 20.69 | 24.98 | 24.29 | 24.82 |
| Silicone Surfactant | 2.20 | 2.20 | 2.20 | 2.20 | 2.20 |
| B-Component | | | | | Terate |
| Polyol[2]- | 15[2]- | 16[2]- | 17[2]- | 18[2]- | 2541[3]- |
| parts | 114.99 | 119.85 | 113.99 | 112.55 | 114.70 |
| HCFC-141b | 25.24 | 26.31 | 25.02 | 24.71 | 25.18 |
| C-Component | | | | | |
| Catalyst[3] | 6.70 | 4.70 | 7.40 | 7.50 | 5.30 |
| FOAM PROPERTIES | | | | | |
| Reactivity, sec (Cream/Firm) | 19/38 | 18/34 | 20/36 | 19/37 | 20/40 |
| Density, lb/ft$^3$ | 3.94 | 2.11 | 2.00 | 2.14 | 1.95 |
| % Shrinkage | 6.92 | 3.49 | 12.73 | 10.46 | 19.90 |

FOOTNOTES:
[1]Of Example 2.
[2]Of Example 9.
[3]Terate 2541 = Aromatic polyester polyol having an overall equivalent weight of 236, an ester equivalent weight of 383, a free glycol content of 10%, and a viscosity of 3,333 cps at 25° C.
[4]Of Example 2.

EXAMPLE 11

This example illustrates the preparation of aromatic polyester polyols by reacting PA with (a) a mixture of EG and DEG and (b) DEG alone.

The starting equivalent ratio of EG:DEG:PA and DEG:PA for Polyol Nos. 19 and 20, respectively, is shown in Table XI below. The polyols were prepared as in Examples 1 and 3, respectively, with the glycols being added in the initial charge. The final free glycol level was adjusted to 8 weight % with DEG.

TABLE XI

PREPARATION OF POLYESTER POLYOLS

| | Equivalent Ratio | | Reaction | | Polyol | | |
|---|---|---|---|---|---|---|---|
| Polyol No. | Charge[1] | Final[2] | Time, min. | Eq. Wt.[3] | Ester Eq. Wt.[4] | % Free Glycol | Viscosity cps, 25° C. |
| 19 | EG:DEG:PA .5:1:1 | EG:DEG:PA .5:1:1 | 180 | 274 | 431 | 8.0 | 40,100 |
| 20 | DEG:PA 2:1 | DEG:PA 1.5:1 | 310 | 297 | 494 | 8.0 | 18,910 |

Footnotes:
[1]Ratio of GLYCOL(S):PA equivalents charged to reaction flask.
[2]Ratio of GLYCOL(S):PA equivalents incorporated into polyester polyol.
[3]Equivalent weight of total polyol mixture inclusive of unreacted glycol.
[4]Equivalent weight of ester portion, i.e., polyester polyol exclusive of unreacted glycol.

EXAMPLE 12

This example illustrates the synthesis of polyisocyanurate foams (12% trimer) from aromatic polyester polyols which contain 8 weight % free glycol and are made from PA and (a) an EG:DEG mixture and (b) DEG alone.

Foams T and U were prepared from the ingredients and quantities thereof listed in Table XII below. The foam preparations and shrinkage determinations were carried out as in Example 2 to give the properties shown in the table.

The results reveal that replacement of 33 mole % of DEG by EG in the production of the polyol leads to an improvement in the resultant foam's shrinkage resistance but a decline in its fire resistance.

TABLE XII

SYNTHESIS AND PROPERTIES OF POLYISOCYANURATE FOAMS

| INGREDIENTS | T | U |
|---|---|---|
| A-Component | | |
| Mondur MR-200[1] | 179.1 | 175.9 |
| HCFC-141b | 15.5 | 21.8 |
| Silicone Surfactant | 2.2 | 2.2 |
| B-Component | | |
| Polyol[2]-parts | 19–120.9 | 20–124.1 |
| HCFC-141b | 26.5 | 27.2 |
| C-Component | | |
| Catalyst[3] | | |
| FOAM PROPERTIES | | |
| Reactivity, sec (Cream/Firm) | 19/47 | 17/40 |

TABLE XII-continued

SYNTHESIS AND PROPERTIES OF POLYISOCYANURATE FOAMS

| INGREDIENTS | FOAMS | |
| --- | --- | --- |
| | T | U |
| Density, lb/ft³ | 1.98 | 1.95 |
| Shrinkage | 1.48 | 4.87 |
| Hot Plate Test | | |
| (4" × 4" × 1" foam sample) | | |
| % weight loss | 49.94 | 26.0 |
| % volume loss | 80.00 | 32.8 |

FOOTNOTES:
[1] Of Example 2.
[2] Of Example 11.
[3] Of Example 2.

EXAMPLE 13

This example illustrates the large-scale production of a high equivalent weight aromatic polyester polyol by reacting PA and DEG.

Polyol No. 21 was manufactured in a pilot reactor by scaling up the procedure of Example 3. The starting and final equivalent ratios of DEG:PA were 2.00 and 1.40, respectively. The reaction time at 220° C. to reach an acid number ≦5 was 7¾ hours. Polyol No. 21's properties are listed in Table XIII below beside those of comparative aromatic polyester polyols.

TABLE XIII

PROPERTIES OF POLYESTER POLYOLS

| | Polyol No. 21 | Terate 2541 | Stepanpol PS-2352 |
| --- | --- | --- | --- |
| Eq. Wt. | 242 | 236 | 235 |
| Ester Eq. Wt. | 638 | 383 | 398 |
| % Free Glycol | 14.85 | 10 | 10.65 |
| Viscosity | | | |
| cps, 25° C. | 19,550 | 3,333 | 2,600 |
| Acid No. | 0.51 | 0.6 | 0.81 |

EXAMPLE 14

This example illustrates the synthesis of polyisocyanurate foams (12% trimer) from a high equivalent weight aromatic polyester polyol of the invention and comparative polyols.

Foams V-X of Table XIV below were prepared from the ingredients and quantities thereof listed in the table. The foam preparations and shrinkage determinations were carried out as described in Example 2 to yield foams having the properties reported in the table, except that the compressive strength and k-factor data were determined on foams produced in a box wherein the foaming product was allowed to rise freely. The data show improvements in the inventive foam's shrinkage resistance, strength and aged insulation value, as compared to the comparative foams.

TABLE XIV

SYNTHESIS AND PROPERTIES OF POLYISOCYANURATE FOAMS

| INGREDIENTS | FOAMS | | |
| --- | --- | --- | --- |
| | V | W | X |
| A-Component | | | |
| Mondur MR-200[1] | 184.24 | 185.68 | 185.7 |
| HCFC-141b | 19.59 | 16.91 | 22.9 |
| Silicone Surfactant | 2.20 | 2.20 | 2.2 |
| B-Component | | | |
| Polyol No. 21[2] | 115.76 | | |
| Terate 2541[2] | | 114.32 | |
| Stepanpol PS-2352[2] | | | 114.3 |
| HCFC-141b | 25.41 | 25.09 | 25.1 |
| C-Component | | | |
| Catalyst[3] | 5.60 | 5.00 | 6.6 |
| FOAM PROPERTIES | | | |
| Reactivity, sec (Cream/Firm) | 19/34 | 21/41 | 20/37 |
| Density, lb/ft³ | 1.84 | 1.83 | 1.74 |
| % Shrinkage | 5.35 | 19.90 | 15.48 |
| % Closed Cells | 89.85 | 89.31 | 89.93 |
| Friability, % | 20.08 | 18.99 | 10.88 |
| Compressive Strength, psi | 39.3 | 25.3 | 23.9 |
| K-Factor | | | |
| Initial | .131 | 131 | .126 |
| 10 days | .144 | .153 | .142 |
| 20 days | .146 | .160 | .148 |
| 30 days | .148 | .166 | .149 |
| 71 days | .155 | .176 | |
| 111 days | | | .170 |

FOOTNOTES:
[1] Of Example 2.
[2] Of Example 13.
[3] Of Example 2.

We claim:

1. A laminate comprising at least one facing sheet adhered to a closed cell, rigid polyisocyanurate foam which comprises the reaction product of a polyisocyanate and an isocyanate-reactive component in the presence of a catalyst and a hydrogen-containing blowing agent or a mixture of a hydrogen-containing blowing agent and at least one co-blowing agent wherein the isocyanate-reactive component comprises (a) a hydroxy terminated polyester having an equivalent weight greater than about 350, or (b) a mixture of the hydroxy terminated polyester with at least one other isocyanate-reactive compound, and wherein the equivalent weight of the hydroxy terminated polyester and the amount thereof in the foam are sufficiently high to reduce the cold temperature shrinkage of the foam to below the cold temperature shrinkage of the corresponding foam having the same density and being prepared from the same foam-forming mixture except that the equivalent weight of the hydroxy terminated polyester and/or the amount thereof is lower.

2. A laminate comprising at least one facing sheet adhered to a closed cell, rigid polyurethane foam comprising the reaction product of a polyisocyanate and an isocyanate-reactive component in the presence of a catalyst and a hydrogen-containing blowing agent or a mixture of a hydrogen-containing blowing agent and at least one co-blowing agent wherein the isocyanate-reactive component comprises a mixture of a hydroxy terminated polyester having an equivalent weight greater than about 350 with at least one other isocyanate-reactive compound, and wherein the equivalent weight of the hydroxy terminated polyester and the amount thereof in the foam are sufficiently high to reduce the cold temperature shrinkage of the foam to below the cold temperature shrinkage of the corresponding foam having the same density and being prepared from the same foam-forming mixture except that the equivalent weight of the hydroxy terminated polyester and/or the amount thereof is lower.

3. The laminate of claim 1 wherein the hydrogen-containing blowing agent is selected from the group consisting of 1,1-dichloro-1-fluoroethane, monochlorodifluoromethane, 1-chloro-1,1-difluoroethane, 1,1-difluoroethane, 1,1,1,2-tetrafluoroethane, 1,1,1,4,4,4-hexafluorobutane, 1,1,1,4,4-pentafluorobutane, difluoromethyl-1,1,1-trifluoroethylether, 1,1,2,2,3-pentafluoropropane, 1,1,1,2,3-pentafluoropropane, 1,1,1,3,3-pentafluoropropane, n-pentane, isopentane, cyclopentane, and mixtures thereof.

4. The laminate of claim 1 wherein the hydroxy terminated polyester is the reaction product of a polycarboxylic acid component and an aliphatic diol of the formula:

HO—R—OH wherein R is a divalent radical selected from the group consisting of:
(a) alkylene radicals containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

5. The laminate of claim 4 wherein the hydroxy terminated polyester is an aromatic compound.

6. The laminate of claim 5 wherein the polycarboxylic acid component is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

7. The laminate of claim 1 which includes at least one additive selected from the group consisting of viscosity reducers, time retardants, dispersing agents, plasticizers, mold release agents, antioxidants, compatibility agents, fillers and pigments.

8. The laminate of claim 1 wherein the hydroxy terminated polyester has an equivalent weight of at least about 400.

9. The laminate of claim 8 wherein the isocyanate-reactive component comprises (a) a hydroxy terminated aromatic polyester, or (b) a mixture of the hydroxy terminated aromatic polyester with at least one glycol, the content of the glycol in mixture (b) being no more than about 30 percent by weight.

10. The laminate of claim 8 wherein the hydroxy terminated aromatic polyester is the reaction product of a polycarboxylic acid component and an aliphatic diol of the formula:

HO—R—OH wherein R is a divalent radical selected from the group consisting of:
(a) alkylene radicals containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

11. The laminate of claim 10 wherein the polycarboxylic acid component is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

12. The laminate of claim 10 wherein the polycarboxylic acid component is selected from the group consisting of (a) ester-containing by-products from the manufacture of dimethyl terephthalate, (b) scrap polyalkylene terephthalates, (c) phthalic anhydride, (d) terephthalic acid, (e) residues from the manufacture of terephthalic acid, and (f) combinations thereof.

13. The laminate of claim 10 wherein the isocyanate-reactive component comprises a mixture of a hydroxy terminated aromatic polyester having an equivalent weight of at least about 450 with at least one glycol, the content of the glycol in the mixture being no more than about 20 percent by weight.

14. The laminate of claim 13 wherein the polyisocyanate comprises polymethylene polyphenylisocyanate and the hydrogen-containing blowing agent is selected from the group consisting of 1,1-dichloro-1-fluoroethane, monochlorodifluoromethane, 1-chloro-1,1-difluoroethane, 1,1-difluoroethane, 1,1,1,2-tetrafluoroethane, 1,1,1,4,4,4-hexafluorobutane, 1,1,1,4,4-pentafluorobutane, difluoromethyl-1,1,1-trifluoroethylether, 1,1,2,2,3-pentafluoropropane, 1,1,1,2,3-pentafluoropropane, 1,1,1,3,3-pentafluoropropane, n-pentane, isopentane, cyclopentane, and mixtures thereof.

15. The laminate of claim 13 wherein the polyisocyanate comprises polymethylene polyphenylisocyanate and the polycarboxylic acid component used in the preparation of the hydroxy-terminated aromatic polyester is selected from the group consisting of phthalic anhydride, phthalic acid, terephthalic acid, residues from the manufacture of terephthalic acid, and mixtures thereof.

16. The laminate of claim 15 wherein the aliphatic diol used in the preparation of the hydroxy terminated aromatic polyester comprises a mixture containing 34 to 100 mole percent of diethylene glycol and 0 to 66 mole percent of ethylene glycol.

17. The laminate of claim 16 wherein the hydroxy terminated aromatic polyester has an equivalent weight of at least about 500.

18. The laminate of claim 2 wherein the hydroxy terminated polyester is the reaction product of a polycarboxylic acid component and an aliphatic diol of the formula:

HO—R—OH wherein R is a divalent radical selected from the group consisting of:
(a) alkylene radicals containing from 2 through 6 carbon atoms, and
(b) radicals of the formula:

$$-(R^1O)_m-R^1-$$

$R^1$ is an alkylene radical containing from 2 through 6 carbon atoms, and m is an integer of from 1 through 4, and
(c) mixtures thereof.

* * * * *